(12) United States Patent
Singenberger et al.

(10) Patent No.: US 6,805,373 B2
(45) Date of Patent: Oct. 19, 2004

(54) BICYCLE FRAME

(75) Inventors: Rolf Singenberger, Echallens (CH); Daniel Weibel, Pratteln (CH)

(73) Assignee: BMC Trading AG, Grenchen (CH)

( * ) Notice: Subject to any disclaimer, the term of this patent is extended or adjusted under 35 U.S.C. 154(b) by 79 days.

(21) Appl. No.: 10/125,753

(22) Filed: Apr. 18, 2002

(65) Prior Publication Data

US 2003/0197346 A1 Oct. 23, 2003

(51) Int. Cl.$^7$ ............................................. B62K 9/00
(52) U.S. Cl. ..................................................... 280/281.1
(58) Field of Search .............................. 280/284, 285, 280/286, 288, 288.1; 264/257, 258, 313–317

(56) References Cited

U.S. PATENT DOCUMENTS

| | | | | |
|---|---|---|---|---|
| 2,729,466 A | * | 1/1956 | Giordani | 280/281.1 |
| 5,076,601 A | * | 12/1991 | Duplessis | 280/281.1 |
| 5,368,804 A | * | 11/1994 | Hwang et al. | 264/258 |
| 5,445,400 A | * | 8/1995 | Martin et al. | 280/281.1 |
| 5,452,911 A | * | 9/1995 | Klein et al. | 280/288 |
| 5,676,780 A | * | 10/1997 | Chen et al. | 156/79 |
| 5,797,613 A | * | 8/1998 | Busby | 280/284 |
| 5,803,476 A | * | 9/1998 | Olson et al. | 280/281.1 |
| 5,853,651 A | * | 12/1998 | Lindsay et al. | 264/512 |
| 5,876,054 A | * | 3/1999 | Olson et al. | 280/281.1 |
| 6,270,104 B1 | * | 8/2001 | Nelson et al. | 280/281.1 |
| 6,406,048 B1 | * | 6/2002 | Castellano | 280/284 |

* cited by examiner

Primary Examiner—Lesley D. Morris
Assistant Examiner—Paul Royal, Jr.
(74) Attorney, Agent, or Firm—Pearne & Gordon LLP

(57) ABSTRACT

The chain fork (1) of a bicycle frame is designed as a single unit consisting of a fiber-reinforced polymer material. The chain fork (1) is preferably connected with and cemented to a pedal crank enclosure via an appropriate receptacle.

10 Claims, 3 Drawing Sheets

BICYCLE FRAME

This invention relates to a bicycle frame based on the main concept specified in claim 1.

Bicycle frames are exposed to severe strain and stress under the most diverse operating conditions and must therefore be built with a high degree of sturdiness and rigidity. This applies collectively to all tubular sections, braces and brackets making up the frame as well as to the connections between the preferably tubular braces.

Accordingly, it is the objective of this invention to introduce a way to further enhance the sturdiness and rigidity of a bicycle frame.

A solution toward achieving the objective of this invention is offered by a bicycle frame as specified in claim 1.

It provides for the bicycle frame to incorporate a one-piece, forked chain bracket produced from a fiber-reinforced polymer material.

The chain bracket or fork preferably consists of a fiber-reinforced, at least partly cross-linkable polymer. The fibers employed are carbon fibers, mineral fibers, metal fibers or high-quality polymer fibers such as aramide fibers.

The chain fork is preferably shaped with the two legs of the fork curved outward as viewed from the crank bearing toward the rear-wheel axle while next to the crank bearing these two bracket legs connect into a single unit.

At the crank-bearing end the chain fork features a male adapter section designed for the plug-in connection with a receptacle provided in or on the crank enclosure.

The chain fork, i.e. its two bracket legs, and the aforementioned adapter section are preferably configured as hollow, tubular elements.

As another proposed feature a pedal crank enclosure is provided which incorporates the aforementioned receptacle for accepting the adapter section of the chain fork.

As another proposed feature the pedal crank enclosure is provided with at least one and preferably two support surfaces or support consoles on which the saddle-pillar tube and, where appropriate, the bottom tube of the frame, butting at an oblique angle, are welded to the pedal crank enclosure. This angled junction of both the saddle-pillar tube and the bottom frame tube with the said support surface or support console results in a longer welded seam which increases the rigidity of the connection with the crank enclosure.

Toward the end facing the rear-wheel axle of the bicycle the two bracket legs of the chain fork are each provided with a socket permitting their connection to the rear-wheel axle for instance via a metal adapter.

The pedal crank enclosure, preferably consisting of a metal such as aluminum, and the chain fork, consisting of a fiber-reinforced polymer, are solidly cemented together.

The characteristic features of other preferred design variations of the bicycle frame according to this invention are specified in the subordinated claims.

The following explains this invention in more detail by way of examples and with reference to the attached drawings in which.

Figure 1:
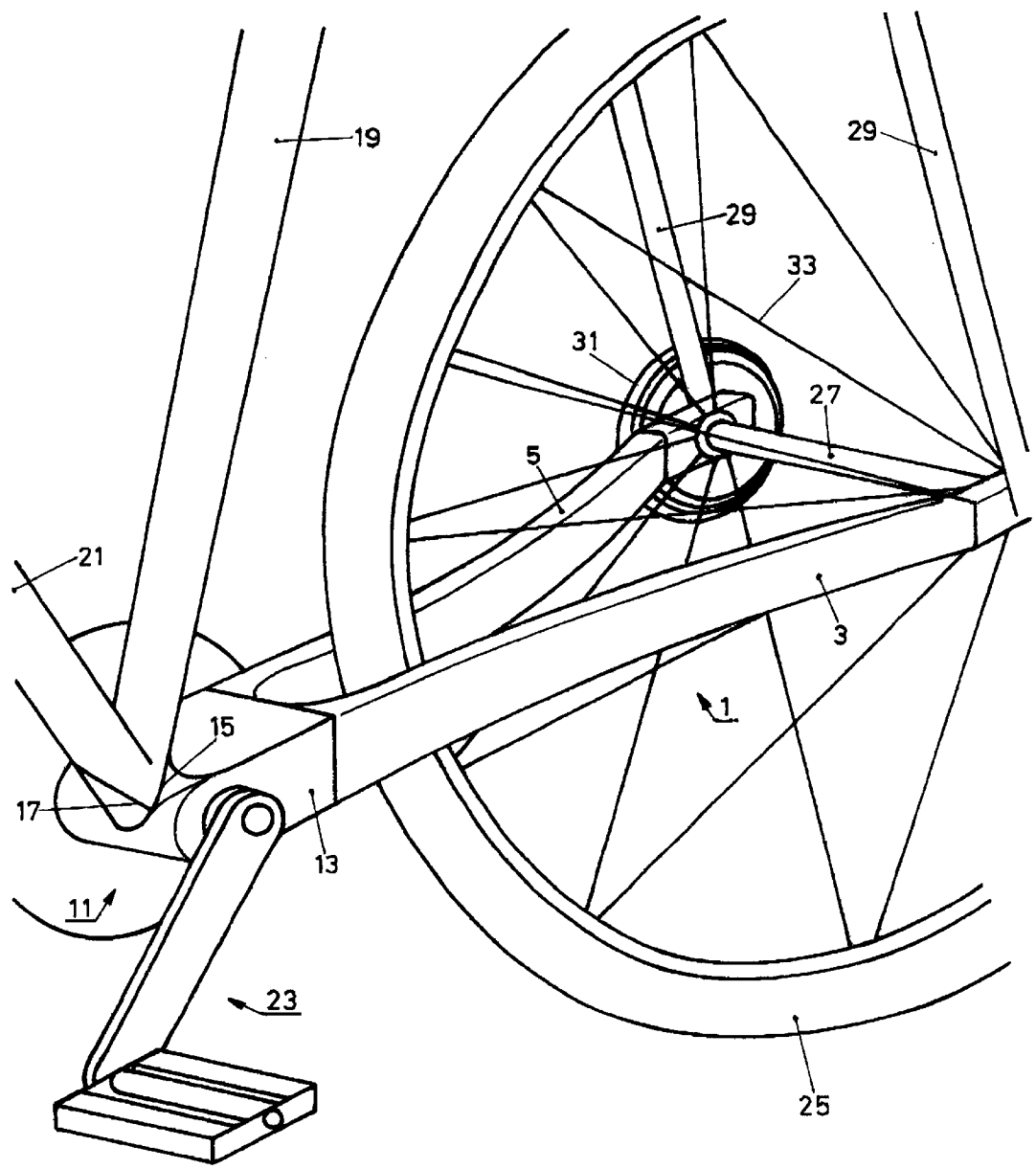
FIG. 1 is a lateral perspective illustration of the section of a bicycle that includes the crank with pedal, the rear wheel and in particular the chain fork.

The schematic illustration in FIG. 1 shows a lateral view of the section of a bicycle between the crank bearing and the rear-wheel axle. This drawing clearly depicts the chain fork 1 per this invention, with the two bracket legs 3 and 5 which curve outwards between the crank bearing or pedal crank enclosure 11 and the rear-wheel axle 27 of the bicycle. The chain fork 1 is plugged into a receptacle 13 on the pedal crank enclosure 11. This connection will be better understood with the aid of the subsequent FIGS. 2 and 3. The pedal crank enclosure 11 features two support surfaces 15 and 17 serving for the connection of the crank enclosure 11 with both the saddle-pillar tube 19 and the forward frame tube 21. These two support surfaces or consoles are shaped in a way as to permit the two tubes, resting on or butting against these surfaces at an oblique angle, to be connected with them by an appropriate welding process. The advantage of this oblique angle lies in the fact that it results in a longer weld and thus in the augmented sturdiness and rigidity of the connection.

Also depicted is a pedal 23 which extends from the pedal crank enclosure 11.

At the end next to the rear-wheel axle 27 the two tubular bracket elements 3 and 5 connect to that rear-wheel axle 27 via plug-in sockets and corresponding adapters. Also depicted are the two rear-wheel frame tubes 29 which connect the rear-wheel axle with the saddle-pillar tube 19, and, schematically outlined, a gear-changing sprocket 31 as well as a few spokes 33.

Figure 2A:
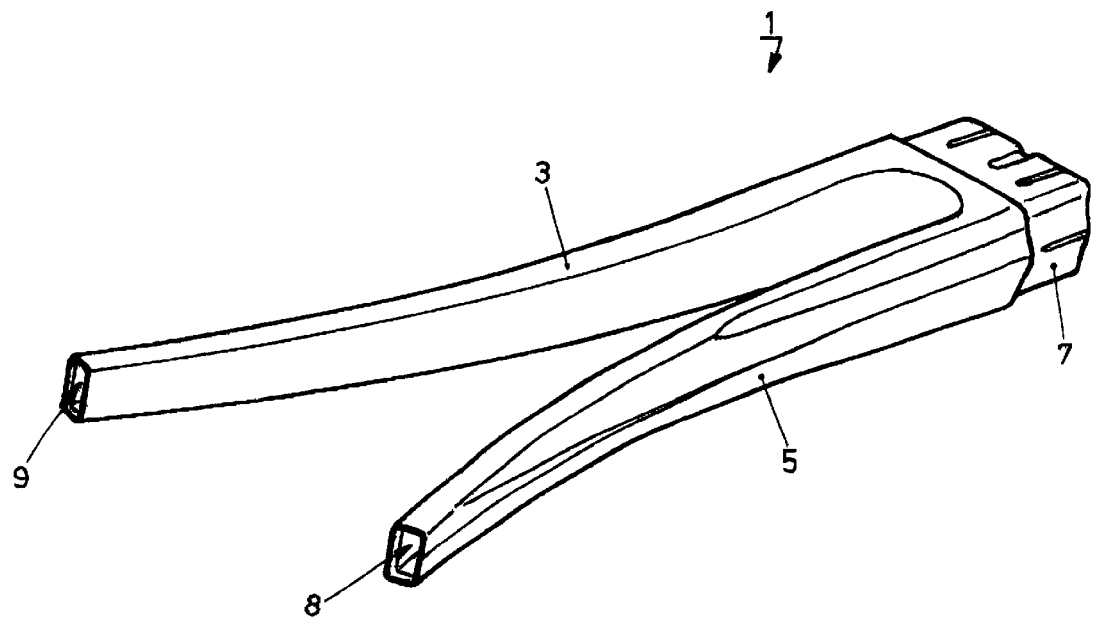
FIGS. 2a & 2b are lateral perspective illustrations of the chain fork per FIG. 1, viewed from the front and back, respectively.
Figure 2B:
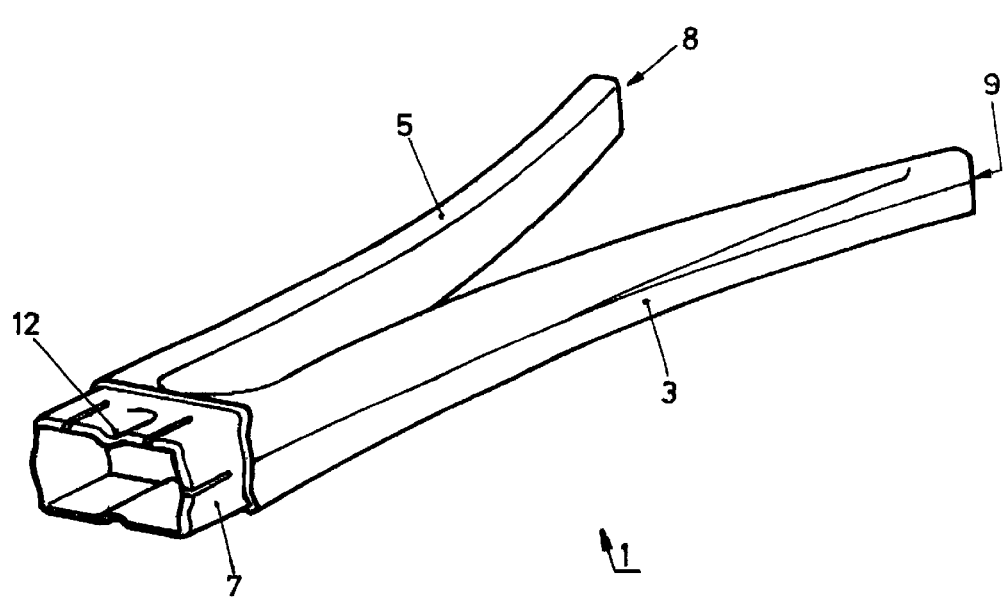

FIGS. 2a and 2b represent lateral perspective front and rear views of the chain fork 1. They show clearly how the two tubular bracket elements 3 and 5 are flared or curved outwards from the pedal crank enclosure toward the rear-wheel axle, preferably in uniform fashion. Next to the pedal crank enclosure the two bracket elements are merged into a one-piece unit via a male adapter section 7 designed to be plugged into a corresponding receptacle on the pedal crank enclosure. The adapter 7 and the bracket elements 3 and 5 are hollow, tubular components. The ends of the two bracket elements 3 and 5 next to the rear-wheel axle are suitably designed to accept for instance metal adapters for the connection between the chain fork and the rear-wheel axle.

Figure 3A:
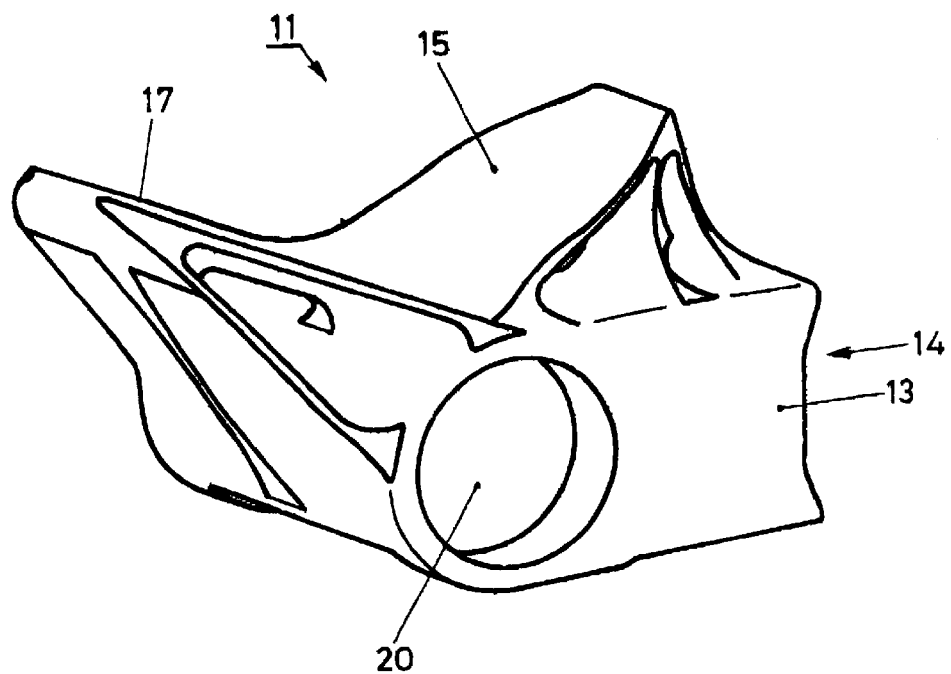
FIGS. 3a & 3b are lateral perspective illustrations of the pedal crank enclosure, viewed from the front and back.
Figure 3B:
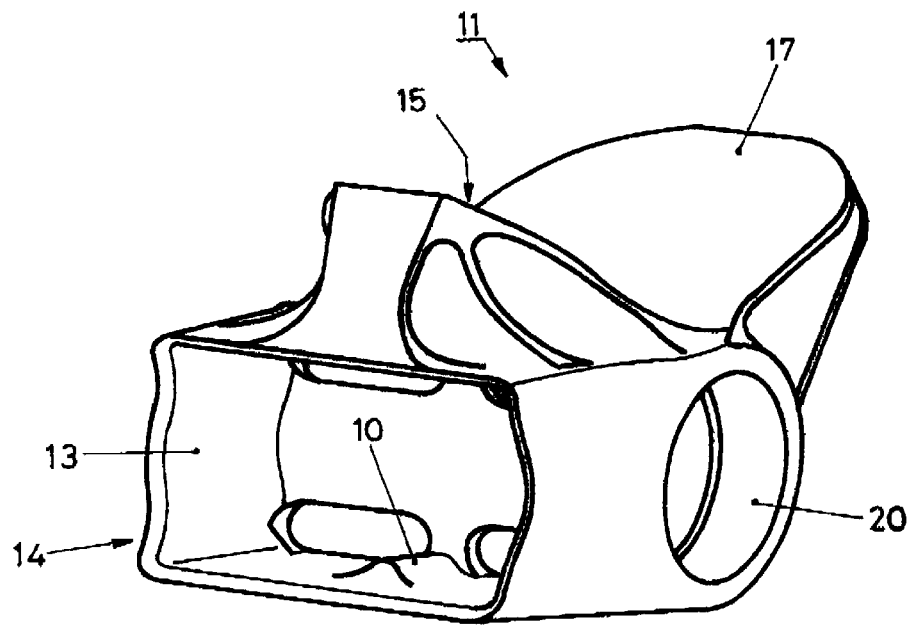

FIGS. 3a and 3b are lateral perspective front and rear views of the pedal crank enclosure 11. Clearly identifiable is the receptacle 13 which serves to accept the adapter section 7 of the chain fork 1. Suitable perforations, protrusions or indentations 12 may be provided for instance on the adapter section 7 for insertion into corresponding guide lugs or indentations 10 on the inside 14 of the receptacle. These components can ultimately be cemented together.

The FIGS. 3a and 3b also show the support surfaces or consoles 15 and 17 to which the saddle-pillar tube and the forward tube of the bicycle frame are to be welded. The perspective view in FIGS. 3a and 3b will give an idea of the fact that the welded joint is longer by a fair amount than the currently customary welds between the pedal crank enclosure and the tubes of the frame, where the tubes butt directly against the tubular crankshaft enclosure. The drawings also show the opening 20 through which the pedal shaft is inserted.

As mentioned above, the advantage of a one-piece unitary chain fork lies in the substantially greater stability of the connection between the pedal crank enclosure and the rear-wheel axle. This is of particular importance in view of the much lighter materials used nowadays, such as carbon-fiber-reinforced, partly to highly crosslinked polymer materials like epoxy resins, polyester resins, polyurethane resins etc. The pedal crank enclosure itself is preferably made of aluminum which is the metal of choice currently used in quality bicycles.

Of course, the bicycle frame components as depicted in FIGS. 1 to 3 are examples only, serving to explain the concept of this invention in some detail. Obviously, the individual parts can be configured in a variety of ways. Nor are the materials from which the individual components are produced a primary object of this invention. Instead, the chain fork may be manufactured from any of the currently used high-technology polymer compounds with high-performance fiber reinforcement. Nor is it imperative that the pedal crank enclosure be made of aluminum; it is entirely possible to use other metals such as titanium, special light metal alloys etc.

What is claimed is:

1. A bicycle frame, characterized by a chain fork (1) made in one piece from a fiber-reinforced polymer frame wherein the chain fork (1) is exclusively curved outward in an arc from a crank bearing bearing or pedal crank enclosure (11) toward a rear-wheel axle (27).

2. A bicycle frame, comprising a chain fork (1) consisting of a fiber-reinforced, at least partly cross-linkable polymer, and the fibers employed are carbon fibers, mineral fibers, metal fibers or high-quality polymer fibers wherein the chain fork (1) is exclusively curved outward in an arc from a crank bearing bearing or pedal crank enclosure (11) toward a rear-wheel axle (27).

3. The bicycle frame as in claim 1, wherein in an area next to the crank bearing two tubular bracket legs (3, 5) of the fork are merged into one unit.

4. The bicycle frame as in claim 3, wherein in the area next to the crank bearing or pedal crank enclosure (11), the chain fork features a male adapter section (7) designed to be inserted in a receptacle (13) provided in or on the pedal crank enclosure.

5. The bicycle frame as in claim 4, wherein the chain fork, the two bracket legs and the adapter section are hollow tubular elements.

6. The bicycle frame as in claim 1, further comprising a pedal crank enclosure (11) with a receptacle (13) designed to accept an adapter section (7) of the chain fork (1).

7. The bicycle frame as in claim 1, further comprising a pedal crank enclosure (11) featuring at least one support surface (15, 17) or support console designed to connect a saddle-pillar tube (19) of the bicycle frame, butting at an oblique angle, with the pedal crank enclosure (11) by means of a welded junction.

8. The bicycle frame as in claim 3, wherein the two tubular bracket legs (3, 5) of the chain fork (1) are each provided at their respective end facing the rear-wheel axle (27) with a socket (8, 9) that permits each to be connected to the rear-wheel axle (27).

9. The bicycle frame as in one of claims 6 to 8, wherein the chain fork (1) and the pedal-crank or crank-bearing enclosure (11) are solidly cemented together.

10. A bicycle frame, characterized by a chain for (1) made in one piece from fiber-reinforced polymer frame wherein the chain fork comprises curved legs (3, 5) that diverge from each other at an increasing rate along their entire lengths.

* * * * *

UNITED STATES PATENT AND TRADEMARK OFFICE
CERTIFICATE OF CORRECTION

PATENT NO. : 6,805,373 B2
DATED : October 19, 2004
INVENTOR(S) : Rolf Singenberger et al.

It is certified that error appears in the above-identified patent and that said Letters Patent is hereby corrected as shown below:

Column 3,
Line 17, please delete "a crank bearing bearing or", and insert therefor -- a crank bearing or --.

Signed and Sealed this

Twenty-sixth Day of April, 2005

JON W. DUDAS
*Director of the United States Patent and Trademark Office*